United States Patent [19]

Herchenbach et al.

[11] Patent Number: 4,505,051

[45] Date of Patent: Mar. 19, 1985

[54] CYCLONE HEAT EXCHANGER INCLUDING SEGMENTED IMMERSION PIPE

[75] Inventors: Horst Herchenbach, Hennef; Fritz Seelen; Hubert Ramesohl, both of Bergisch Gladbach; Peter Hündgen, Euskirchen; Horst Schilling, Cologne, all of Fed. Rep. of Germany

[73] Assignee: Klöckner-Humboldt-Deutz AG, Fed. Rep. of Germany

[21] Appl. No.: 519,370

[22] Filed: Aug. 1, 1983

[30] Foreign Application Priority Data

Aug. 3, 1982 [DE] Fed. Rep. of Germany ....... 3228902

[51] Int. Cl.[3] ...................... F26B 17/14; B01D 45/12; B04C 5/085

[52] U.S. Cl. ...................................... 34/57 E; 55/267; 55/412; 55/435; 55/459 R; 209/144; 422/147; 432/58

[58] Field of Search ............. 55/267, 411, 412, 459 R, 55/435; 209/144; 165/119; 34/57 R, 57 A, 57 E, 58; 432/15, 58; 422/147

[56] References Cited

U.S. PATENT DOCUMENTS 1,393,553 10/1921 Leonhardt ............................ 55/411
1,393,554 10/1921 Leonhardt ............................ 55/411
1,844,369 2/1932 Ross ........................................ 55/267
3,273,320 9/1966 Delaune et al. ........................ 55/267
3,667,196 6/1972 Koenecke ............................ 55/411
4,342,574 8/1982 Fetzer .................................. 55/267

FOREIGN PATENT DOCUMENTS 2361995 7/1980 Fed. Rep. of Germany .

*Primary Examiner*—David L. Lacey
*Attorney, Agent, or Firm*—Hill, Van Santen, Steadman & Simpson

[57] ABSTRACT

A cyclone heat exchanger particularly adapted for direct heat exchange between a granular product and hot exhaust gases from a kiln used in the production of cement, the heat exchanger comprising a housing, a gas feed pipe introducing hot gases tangentially of the housing, a cover extending across the top of the housing, a discharge at the base of the housing for discharging product therefrom. The improvement consists of an immersion pipe extending through the cover and into the housing, the immersion pipe consisting of a plurality of segments extending in the longitudinal direction of the immersion pipe. Holding devices are provided for releasably holding segments in the cover.

9 Claims, 3 Drawing Figures

CYCLONE HEAT EXCHANGER INCLUDING SEGMENTED IMMERSION PIPE

BACKGROUND OF THE INVENTION

1. Field of the Invention

This invention is in the field of cyclone heat exchangers, particularly those employed for direct heat exchange between a granular product and hot exhaust gases in the manufacture of cement. The invention is particularly concerned with an immersion pipe which extends through the cover of the cyclone heat exchanger and is composed of a plurality of loosely fitting segments extending in the longitudinal direction of the immersion pipe, the segments being releasably secured to the cover.

2. Description of the Prior Art

In German Pat. No. 23 61 995 there is described a cyclone heat exchanger having an immersion pipe centrally projecting into the heat exchanger from the top and being rigidly connected to the cover of the cyclone heat exchanger. In its central area this single-piece immersion pipe is provided with gas entry openings in its pipe jacket, the openings being formed by means of radial impression of brackets.

Cyclone heat exchangers having a sigle-piece immersion pipe rigidly connected to the cover, particularly when used for direct heat exchange between a granular product and hot kiln exhaust gases in the pre-calcining stage of a rotary tubular kiln system for manufacturing cement, are subject to bending and battering. As a result, cross-sectional changes of the immersion pipe can occur due to high thermal overloads particularly in the radial direction and often local in scope. The danger also exists that the immersion pipe will break in the area of the rigid connection to the heat exchanger or that parts will separate from the immersion pipe jacket and fall into the heat exchanger. This danger particularly exists in cyclone heat exchangers which must be dimensioned in large sizes for high throughput and separating efficiency and particularly those which directly follow the rotary tubular kiln and/or are equipped with auxiliary heating units such as a "Pyroclon" unit.

A change in the cross section of the immersion pipe not only leads to a considerable diminution of the separating efficiency but also can lead to a change in the flow resistance of the gas in the pre-calcining zone which provides a disadvantageous effect on the overall calcining process. If the immersion breaks off or parts thereof break off and fall into the cyclone heat exchanger, a blockage of the cyclone discharge can occur so that the entire rotary tubular kiln heat exchanger system must be shut down. The loss of production and very high repair costs are the natural consequence.

SUMMARY OF THE INVENTION

The present invention consists of an improved immersion pipe structure for a cyclone heat exchanger, particularly one used for direct heat exchange between a granular product and hot kiln exhaust gases of a rotary tubular kiln used for manufacturing cement. The immersion pipe is connected to the cyclone heat exchanger in such a manner that all cross-sectional changes or breaks at the immersion pipe are avoided even with high thermal overloads.

The immersion pipe structure of the present invention projects into the cyclone heat exchanger housing from the top and consists of a plurality of individual segments extending in the longitudinal direction of the pipe, the segments being releasably held in the cover of the cyclone heat exchanger. With this type of construction, the immersion pipe can freely expand in the circumferential direction and in the radial direction upon facing thermal stresses. Deformations of the immersion pipe jacket or even ruptures of the pipe jacket are substantially avoided even with high and non-uniform thermal stresses. A further advantage arises from the fact that neither a change of the flow resistance of the gas in the pre-calcining zone nor a blockage of the solids discharge at the cyclone can occur during operation of the heat exchanger. Still another advantage is that both individual as well as all pipe segments can be very easily replaced with a relatively low output in terms of time and work.

In a preferred form of the invention, the immersion pipe segments are provided at their upper ends with at least one outwardly projecting, angular projection which is received within a suitably formed stay disposed on the cover of the cyclone heat exchanger. Immersion pipe segments designed in this manner provide a particularly easy assembly or disassembly since they can quite simply be suspended or disengaged from the top of the cyclone.

To facilitate replacement of the immersion pipe segments with a low output in terms of work, time and cost, the pipe segments are made releasable to the cover of the cyclone heat exchanger.

In another preferred form of the invention, the segments at their bottom are surrounded by a ring in loosely fitting relation. The pipe segments are thereby held together at their lower ends with the aid of the ring and the annular form of the immersion pipe is maintained during operation of the cyclone heat exchanger even in the presence of high thermal stresses.

In a further embodiment of the invention, the immersion pipe segments consist of a refractory material, such as ceramic, at least in those portions of the segments which extend into the housing. The service life of the immersion pipe segments and, thereby, the service life of the immersion pipe is thereby increased to a very considerable degree in an advantageous manner.

BRIEF DESCRIPTION OF THE DRAWINGS

Several embodiments of the present invention are shown in the attached sheets of drawings in which.

DESCRIPTION OF THE PREFERRED EMBODIMENTS

Figure 1:
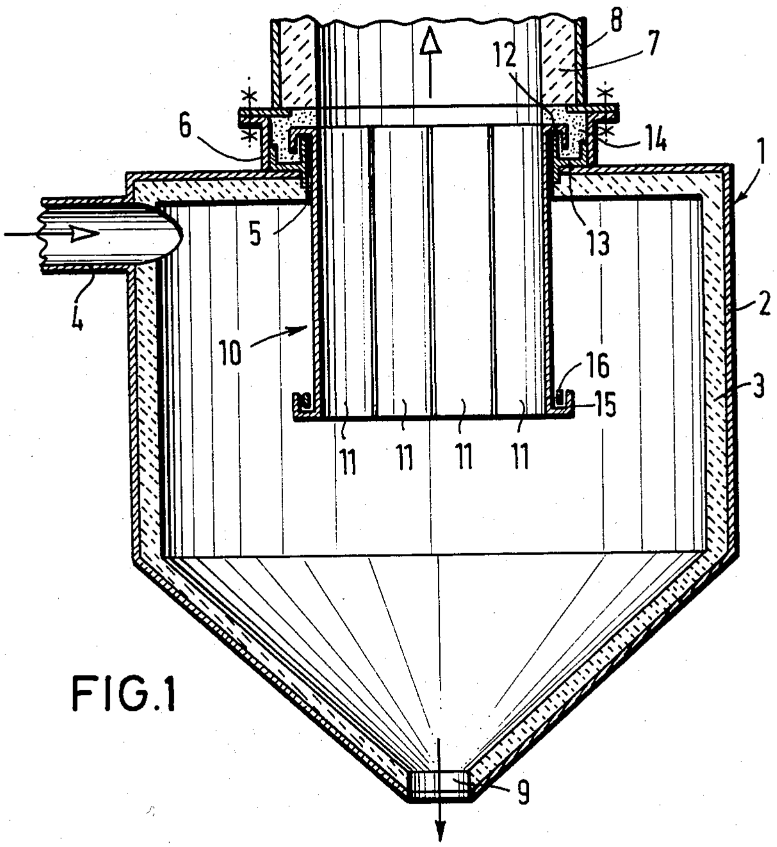
FIG. 1 is a longitudinal section through a cyclone heat exchanger having an immersion pipe according to the present invention.

In FIG. 1 there is shown a cyclone heat exchanger having a housing 1 which is cylindrical in its upper end and conical in its lower end. The housing 1 consists of a sheet metal jacket 2 which is provided with a refractory lining 3 on its inside. An inlet pipe 4 for introducing the gas feed is connected in the upper portion of the cyclone heat exchanger and tangentially discharges into the interior of the housing 1. An opening 5 for gas withdrawal is disposed in the central area of a cover of the cyclone heat exchanger and receives a gas withdrawal pipe 8 provided with a refractory inner lining 7, the pipe 8 being received over a pipe socket 6 which is secured to the cover. The conical floor of the cyclone heat exchanger is provided with a central opening 9 for discharging solid particles.

An immersion pipe 10 is centrally disposed in the opening 5 and being immersed into the interior of the housing 1, the immersion pipe 10 consisting of a plurality of individual segments 11 extending in the longitudinal direction of the pipe. At their upper ends, the immersion pipe segments 11 are provided with outwardly projecting, angular projections 12 which are received against a stay 13 connected to the cover of the cyclone heat exchanger. The stay 13 is angularly designed in cross section and is rigidly welded to the sheet metal wall of the cyclone heat exchanger. The area between the angular projections 12 of the immersion pipe segments 11 and the gas withdrawal pipe is filled with a monolithic fireproof refractory lining material 14.

At the lower ends of the segments 11 there are provided mounts 15 which are U-shaped in cross section, which mounts may be integral with the segments or separate therefrom. A ring 16 is loosely received within the annular groove formed in the annular flange portion provided by the mounts 15, the ring 16 serving to hold together the segments 11 at their lower ends.

During assembly of the immersion pipe 10 according to the present invention, the individual segments 11 are suspended from the top in the stay 13 in depending relation, their outwardly projecting angular projections 12 contacting one another at their longitudinal side edges around the periphery of the ring. Subsequently, the ring 16 is inserted in the U-shaped mounts 15 at the lower ends of the immersion pipe segments and the space between the gas withdrawal pipe 8 with its inner lining 7 and the immersion pipe suspension consisting of angular projections 12, stay 13, and pipe socket 6 is filled with a monolithic refractory fireproof lining material 14.

The plurality of individual segments, being suspended in the cover of the cyclone heat exchanger, are disposed such that they only loosely contact one another at their longitudinal sides. Consequently, they can expand in the circumferential direction upon application of thermal stresses existing during operation so that deformation of or damage to the immersion pipe due to excessive heat are substantially avoided. In the event that individual immersion pipe segments or all the segments would have to be replaced, this can be accomplished very easily and in a very simple manner proceeding from the inside of the heat exchanger. The only thing required is the elimination and re-introduction of the monolithic lining material 14 situated above the angular immersion pipe projections and the elimination and re-application of the ring 16 situated at the lower ends of the immersion pipe segments 11.

Figure 2:
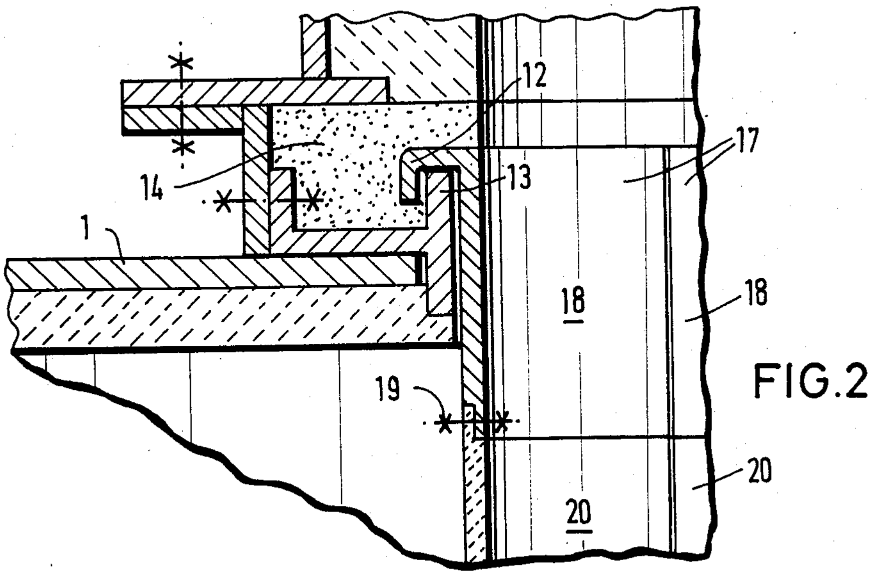
FIG. 2 is a fragmentary cross-sectional view of a non-homogeneous pipe, shown in an enlarged scale.

As further shown in FIG. 2, the immersion pipe segments can consist of a refractory material at least in the region projecting into the heat exchanger housing. The immersion pipe segments 17 can be designed of non-homogeneous construction, namely, consisting of an upper portion 18 composed of a heat-resistant metal and a lower part 20 composed of ceramic or the like, the two parts being connected with bolts 19. The upper part 18 of the immersion pipe segment can consist of sheet steel.

As a result of this design, the service life of the individual immersion pipe segments and the service life of the immersion pipe are increased to a very significant degree even in the presence of high thermal stresses. Plates consisting of sintered wolframite $(Fe,Mn)WO_4$ can also advantageously be employed instead of the ceramic parts 20. The parts 18 and 20 of the immersion pipe segment can be connected to one another by means of hard soldering, welding or other types of bonding.

Figure 3:
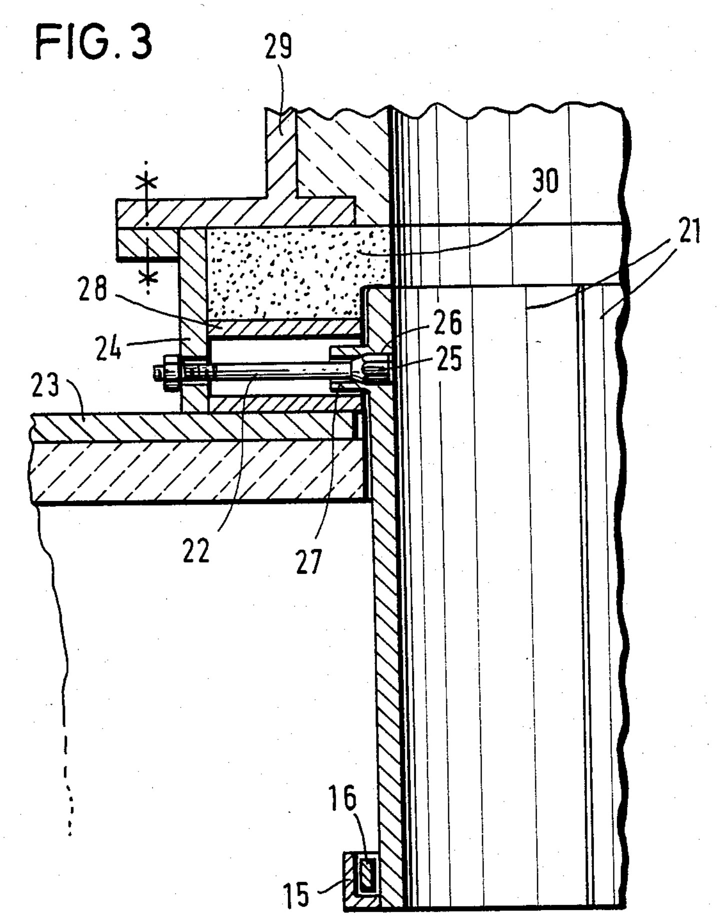
FIG. 3 is a fragmentary cross-sectional view of another form of the invention utilizing bolts to releasably secure the segments to the cover of the cyclone heat exchanger.

It is also possible to produce the immersion pipe entirely of heat-resistant material. As shown in FIG. 3, for example, immersion pipe segments 21 can be designed as simple, rectangular plates which are rigidly connected at their top ends with the aid of spaced bolts 22 to a pipe socket 24 and disposed on the cover of the cyclone heat exchanger 23. The heads 25 of the bolts 22 are thereby each expediently set into a recess 26 of corresponding size having an outwardly directed projection 27. In the clearance space between the immersion pipe segments 21 and the pipe socket 24, the body of the bolt 22 is protected by a sleeve 28. The spaces between the immersion pipe segments 21 and the pipe socket 24 as well as the spaces between them and the gas withdrawal pipe 29 can likewise be filled with a monolithic, refractory lining material 30. The advantage of this design involving a releasable connection of the immersion pipe segments 21 to the cyclone heat exchanger 23 illustrated in FIG. 3 consists in the fact that the immersion pipe segments can be very easily radially moved toward the inside as required by means of releasing the bolts 22 and can be removed without the necessity of eliminating the parts of the monolithic lining material 30 situated thereabove. The lining material 30 thereby remains completely unaffected when replacing the immersion pipe segments 21 which provides a work, time and cost saving effect.

The subject matter of the invention is not restricted to the sample embodiments illustrated in the Figures of the drawings. For example, the immersion pipe segments can also be provided with nose-type projections at their upper ends, the projections engaging correspondingly designed mounts disposed on the top of the cyclone heat exchanger. Further, a plurality of mutually interlocking ring segments can be used under some circumstances instead of a continuous ring disposed at the lower end of the immersion pipe segments. Depending on the size of the cyclone heat exchanger, the immersion pipe segments can also be varied in terms of length and in terms of number, and thus can be optimally matched to the thermal stresses occurring during operation of the cyclone heat exchanger while maintaining a high separating efficiency.

It will be understood that various other modifications can be made to the described embodiments without departing from the scope of the present invention.

We claim as our invention:

1. A cyclone heat exchanger particuarly adapted for direct heat exchange between a granular product and hot exhaust gases from a kiln used in the production of cement comprising:

a housing, a gas feed pipe connected to the upper portion of said housing and arranged to introduce gas tangentially into the interior of said housing, a cover extending across the top of said housing, discharge means at the base of said housing for discharging product therefrom, a pipe extending through said cover and immersed into said housing, said pipe consisting of a plurality of segments extending in the longitudinal direction of said pipe, and hanger means releasably holding said segments in said cover.

2. A cyclone heat exchanger according to claim 1 in which:

each of said segments has angular projections thereon, and said hanger means receiving said angular projections for positioning said segments in depending relation.

3. A cyclone heat exchanger according to claim 1 which includes:

spaced bolts cooperating with said hanger means to releasably interconnect said segments to said cover.

4. A cyclone heat exchanger according to claim 3 wherein:

said bolts being positioned and arranged such that their heads are accessible from the interior of said housing.

5. A cyclone heat exchanger according to claim 1 which includes:

a ring confining the lower ends of said segments.

6. A cyclone heat exchanger according to claim 5 in which:

said ring has an annular flange portion receiving the lower ends of said segments.

7. A cyclone heat exchanger according to claim 1 wherein:

each of said segments is composed of a refractory, non-metallic material at least in the portion thereof which extends into the interior of said housing.

8. A cyclone heat exchanger according to claim 7 in which:

each of said segments is composed of a heat-resistant metal at its upper end and a ceramic material at its lower end.

9. A cyclone heat exchanger according to claim 1 in which:

portions of the space between said cover and said segments are filled with a refractory material.

* * * * *